(12) United States Patent
Shahana

(10) Patent No.: US 12,330,733 B2
(45) Date of Patent: Jun. 17, 2025

(54) HUMAN-POWERED VEHICLE CONTROL DEVICE

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 1340 days.

(21) Appl. No.: 16/364,273

(22) Filed: Mar. 26, 2019

(65) Prior Publication Data

US 2019/0300115 A1 Oct. 3, 2019

(30) Foreign Application Priority Data

Mar. 29, 2018 (JP) .................. 2018-065724

(51) Int. Cl.
| | | |
|---|---|---|
| *B60L 9/00* | (2019.01) | |
| *B62J 43/13* | (2020.01) | |
| *B62J 43/28* | (2020.01) | |
| *B62J 45/20* | (2020.01) | |
| *B62M 9/123* | (2010.01) | |
| *B62M 25/08* | (2006.01) | |
| *G01C 22/00* | (2006.01) | |
| *G01P 1/07* | (2006.01) | |
| *G01P 3/50* | (2006.01) | |

(52) U.S. Cl.
CPC .............. *B62J 43/13* (2020.02); *B62J 43/28* (2020.02); *B62J 45/20* (2020.02); *B62M 9/123* (2013.01); *B62M 25/08* (2013.01); *G01C 22/002* (2013.01); *G01P 1/07* (2013.01); *G01P 3/50* (2013.01)

(58) Field of Classification Search
CPC ........ B62M 9/123; B62M 25/08; B62J 50/20; B62J 45/20; B62J 43/13; B62J 43/2862; G01C 22/002; G01P 1/07; G01P 3/50
See application file for complete search history.

(56) References Cited

U.S. PATENT DOCUMENTS

| | | | | |
|---|---|---|---|---|
| 9,815,363 B2* | 11/2017 | Biderman | ................ | B60K 7/00 |
| 2004/0050604 A1* | 3/2004 | Dube | ....................... | B62M 6/65 |
| | | | | 180/206.3 |
| 2015/0229250 A1* | 8/2015 | Fukunaga | ............... | H02P 27/08 |
| | | | | 318/400.23 |

(Continued)

FOREIGN PATENT DOCUMENTS

| | | |
|---|---|---|
| CN | 104554596 A | 4/2015 |
| DE | 10 2017 103 735 A1 | 8/2017 |

(Continued)

*Primary Examiner* — Adam M Alharbi
(74) *Attorney, Agent, or Firm* — Global IP Counselors, LLP

(57) ABSTRACT

A human-powered vehicle control device includes a controller that is configured to control a motor assisting in propulsion of a human-powered vehicle. The controller is configured to control the motor in a first control state in a case where a first parameter increases. The first parameter includes at least one of rotational speed of a crank of the human-powered vehicle, power of human driving force input to the human-powered vehicle, acceleration of the human-powered vehicle, jerk of the human-powered vehicle, and inclination angle of the human-powered vehicle. The controller is configured to control the motor in a second control state that differs from the first control state in a case where the first parameter decreases.

17 Claims, 7 Drawing Sheets

(56) References Cited

U.S. PATENT DOCUMENTS

| | | | |
|---|---|---|---|
| 2016/0375958 A1 | 12/2016 | Hashimoto et al. | |
| 2017/0106866 A1* | 4/2017 | Schieffelin | B60W 10/11 |
| 2018/0029666 A1 | 2/2018 | Shahana et al. | |
| 2018/0215432 A1* | 8/2018 | Tsuchizawa | B62M 25/08 |
| 2019/0315433 A1* | 10/2019 | Hasumi | B62M 6/50 |
| 2020/0156653 A1* | 5/2020 | Kim | B60W 50/10 |

FOREIGN PATENT DOCUMENTS

| | | |
|---|---|---|
| DE | 10 2017 212 865 A1 | 2/2018 |
| DE | 10 2017 213 952 A1 | 2/2018 |
| EP | 1 878 650 A1 | 1/2008 |
| EP | 2 631 165 A1 | 8/2013 |
| JP | 9-156571 A | 6/1997 |
| JP | 9-207866 A | 8/1997 |
| JP | 9-286375 A | 11/1997 |
| JP | 10-59260 A | 3/1998 |
| JP | 10-203467 A | 8/1998 |
| JP | 11-178859 A | 7/1999 |
| JP | 2002-356191 A | 12/2002 |
| JP | 3974979 B2 | 9/2007 |
| JP | 2008-74118 A | 4/2008 |
| JP | 2013-209077 A | 10/2013 |
| JP | 2015-110402 A | 6/2015 |
| JP | 5842105 B2 | 1/2016 |
| JP | 2016-147669 A | 8/2016 |
| JP | 2017-7644 A | 1/2017 |
| JP | 2017-154564 A | 9/2017 |
| JP | 2017-206169 A | 11/2017 |
| JP | 2018-24416 A | 2/2018 |
| KR | 10-2012-0009818 A | 2/2012 |

* cited by examiner

HUMAN-POWERED VEHICLE CONTROL DEVICE

CROSS-REFERENCE TO RELATED APPLICATIONS

This application claims priority to Japanese Patent Application No. 2018-065724, filed on Mar. 29, 2018. The entire disclosure of Japanese Patent Application No. 2018-065724 is hereby incorporated herein by reference.

BACKGROUND

Technical Field

The present invention generally relates to a human-powered vehicle control device.

Background Information

Japanese Laid-Open Patent Publication No. 2015-110402 discloses an example of a human-powered vehicle control device that controls a human-powered vehicle component such as a motor that assists in propulsion of a human-powered vehicle and a transmission that changes a transmission ratio of the human-powered vehicle.

SUMMARY

One object of the present disclosure is to provide a human-powered vehicle control device that suitably controls a human-powered vehicle component.

A human-powered vehicle control device in accordance with a first aspect of the present disclosure comprises an electronic controller configured to control a motor assisting in propulsion of a human-powered vehicle. The electronic controller is configured so that the electronic controller is configured to control the motor in a first control state in a case where a first parameter increases, the first parameter including at least one of rotational speed of a crank of the human-powered vehicle, power of human driving force input to the human-powered vehicle, acceleration of the human-powered vehicle, jerk of the human-powered vehicle, and inclination angle of the human-powered vehicle. The electronic controller is configured to control the motor in a second control state that differs from the first control state in a case where the first parameter decreases.

In accordance with the human-powered vehicle control device of the first aspect, the motor is controlled in a manner suitable for a case where the first parameter increases and a case where the first parameter decreases. The first parameter includes at least one of the rotational speed of a crank of the human-powered vehicle, the power of the human driving force input to the human-powered vehicle, the acceleration of the human-powered vehicle, the jerk of the human-powered vehicle, and the inclination angle of the human-powered vehicle.

In accordance with a second aspect of the present disclosure, the human-powered vehicle control device according to the first aspect is configured so that the electronic controller is configured to control the motor in accordance with the human driving force input to the human-powered vehicle, and the electronic controller is configured to control the motor so that a response speed of an output of the motor with respect to a change in the human driving force differs between the first control state and the second control state.

In accordance with the human-powered vehicle control device of the second aspect, the motor can be controlled at a response speed suitable for a case where the first parameter increases and a case where the first parameter decreases.

In accordance with a third aspect of the present disclosure, the human-powered vehicle control device according to the second aspect is configured so that the electronic controller is configured to control the motor so that the response speed is lower for a case where the human driving force decreases in the first control state than for a case where the human driving force decreases in the second control state.

In accordance with the human-powered vehicle control device of the third aspect, decreases in the output of the motor are more limited in a case where the first parameter increases and the human driving force decreases than in a case where the first parameter decreases and the human driving force decreases. Thus, the user is less likely to feel that the assist force generated by the motor is insufficient.

In accordance with a fourth aspect of the present disclosure, the human-powered vehicle control device according to the second or third aspect is configured so that the electronic controller is configured to control the motor so that the response speed is higher for a case where the human driving force increases in the first control state than for a case where the human driving force increases in the second control state.

In accordance with the human-powered vehicle control device of the fourth aspect, the output of the motor is increases more easily in a case where the first parameter increases and the human driving force increases than in a case where the first parameter decreases and the human driving force increases. Thus, the user is less likely to feel that the assist force generated by the motor is insufficient.

In accordance with a fifth aspect of the present disclosure, the human-powered vehicle control device according to any one of the second to fourth aspects is configured so that the electronic controller is configured to control the motor in any one of the first control state and the second control state so that the response speed is lower for a case where the human driving force decreases than for a case where the human driving force increases.

In accordance with the human-powered vehicle control device of the fifth aspect, in both a case where the first parameter increases and a case where the first parameter decreases, decreases in the output of the motor are limited in a case where the human driving force decreases, and the output of the motor easily increases in a case where the human driving force increases.

In accordance with a sixth aspect of the present disclosure, the human-powered vehicle control device according to any one of the first to fifth aspects is configured so that the electronic controller is configured to control the motor in accordance with the human driving force input to the human-powered vehicle, and the electronic controller is configured to control the motor so that at least one of a ratio of an assist force generated by the motor to the human driving force and a maximum value of an output of the motor differs between the first control state and the second control state.

In accordance with the human-powered vehicle control device of the sixth aspect, the motor is controlled with at least one of the ratio of the assist force and the maximum value of the output of the motor suitable for a case where the first parameter increases and a case where the first parameter decreases.

In accordance with a seventh aspect of the present disclosure, the human-powered vehicle control device according to the sixth aspect is configured so that the electronic controller is configured to control the motor so that the ratio is greater in the first control state than in the second control state.

In accordance with the human-powered vehicle control device of the seventh aspect, the ratio is greater in a case where the first parameter increases than in a case where the first parameter decreases. Thus, the user is less likely to feel that the assist force generated by the motor is insufficient.

In accordance with an eighth aspect of the present disclosure, the human-powered vehicle control device according to the sixth or seventh aspect is configured so that the electronic controller is configured to control the motor so that the maximum value is greater in the first control state than in the second control state.

In accordance with the human-powered vehicle control device of the eighth aspect, the maximum value is greater in a case where the first parameter increases than in a case where the first parameter decreases. Thus, the user is less likely to feel that the assist force generated by the motor is insufficient.

In accordance with a ninth aspect of the present disclosure, in the human-powered vehicle control device according to any one of the first to eighth aspects, the electronic controller is configured to control the motor in a first mode that permits switching between the first control state and the second control state and a second mode that prohibits switching to at least one of the first control state and the second control state.

In accordance with the human-powered vehicle control device of the ninth aspect, switching to at least one of the first control state and the second control state is prohibited by controlling the motor in the second mode.

In accordance with a tenth aspect of the present disclosure, in the human-powered vehicle control device according to the ninth aspect, the electronic controller is configured to switch between the first mode and the second mode in accordance with operation of an operation unit.

In accordance with the human-powered vehicle control device of the tenth aspect, the user can switch between the first mode and the second mode by operating the operation unit.

A human-powered vehicle control device in accordance with an eleventh aspect of the present disclosure comprises an electronic controller configured to control a transmission in a human-powered vehicle including a crank and a drive wheel. The transmission changes a ratio of a rotational speed of the drive wheel to a rotational speed of the crank. The electronic controller is configured to control the transmission in a case where a first parameter increases so as to switch the ratio between a predetermined first ratio and a predetermined second ratio in accordance with a second parameter related to a running state of the human-powered vehicle and a first transmission threshold value set for the second parameter. The first parameter includes at least one of torque of human driving force input to the human-powered vehicle, power of the human driving force input to the human-powered vehicle, acceleration of the human-powered vehicle, jerk of the human-powered vehicle, and inclination angle of the human-powered vehicle. The electronic controller is configured to control the transmission in a case where the first parameter decreases so as to switch the ratio between the predetermined first ratio and the predetermined second ratio in accordance with the second parameter and a second transmission threshold value that differs from the first transmission threshold value and is set for the second parameter.

In accordance with the human-powered vehicle control device of the eleventh aspect, the transmission is controlled so that the transmission ratio becomes suitable for a case where the first parameter increases and a case where the second parameter decreases.

In accordance with a twelfth aspect of the present disclosure, the human-powered vehicle control device according to the eleventh aspect is configured so that the first transmission threshold value is smaller than the second transmission threshold value.

In accordance with the human-powered vehicle control device of the twelfth aspect, the ratio is changed more easily in a case where the first parameter increases than in a case where the first parameter decreases.

In accordance with a thirteenth aspect of the present disclosure, the human-powered vehicle control device according to the eleventh or twelfth aspect is configured so that the second parameter includes at least one of the rotational speed of the crank, the torque of the human-powered vehicle, the power of the human driving force input to the human-powered vehicle, speed of the human-powered vehicle, the acceleration of the human-powered vehicle, the jerk of the human-powered vehicle, and the inclination angle of the human-powered vehicle.

In accordance with the human-powered vehicle control device of the thirteenth aspect, the ratio can be changed by at least one of the rotational speed of the crank, the torque of the human-powered vehicle, the power of the human driving force input to the human-powered vehicle, the speed of the human-powered vehicle, the acceleration of the human-powered vehicle, the jerk of the human-powered vehicle, and the inclination angle of the human-powered vehicle.

In accordance with a fourteenth aspect of the present disclosure, the human-powered vehicle control device according to any one of the first to thirteenth aspects further comprises a detector that detects the first parameter.

In accordance with the human-powered vehicle control device of the fourteenth aspect, the first parameter can be suitably detected by the detector.

The human-powered vehicle control device of the present disclosure suitably controls a human-powered vehicle component.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle control device 40 in accordance with a first embodiment will now be described with reference to FIGS. 1 to 7. Hereinafter, the human-powered vehicle control device 40 will simply be referred to as the control device 40. The control device 40 is provided on a human-powered vehicle 10. The human-powered vehicle 10 is a vehicle that can be driven by at least human driving force. The human-powered vehicle 10 includes, for example, a bicycle. The human-powered vehicle 10 also includes, for example, a unicycle and a vehicle having three or more wheels. The number of wheels is not limited. The human-powered vehicle 10 includes various kinds of bicycles such as a mountain bike, a road bike, a city bike, a cargo bike, a recumbent bike, and an E-bike. The E-bike includes an electric assist bicycle. In the embodiments described hereafter, the human-powered vehicle 10 will be described as a bicycle.

Figure 1:
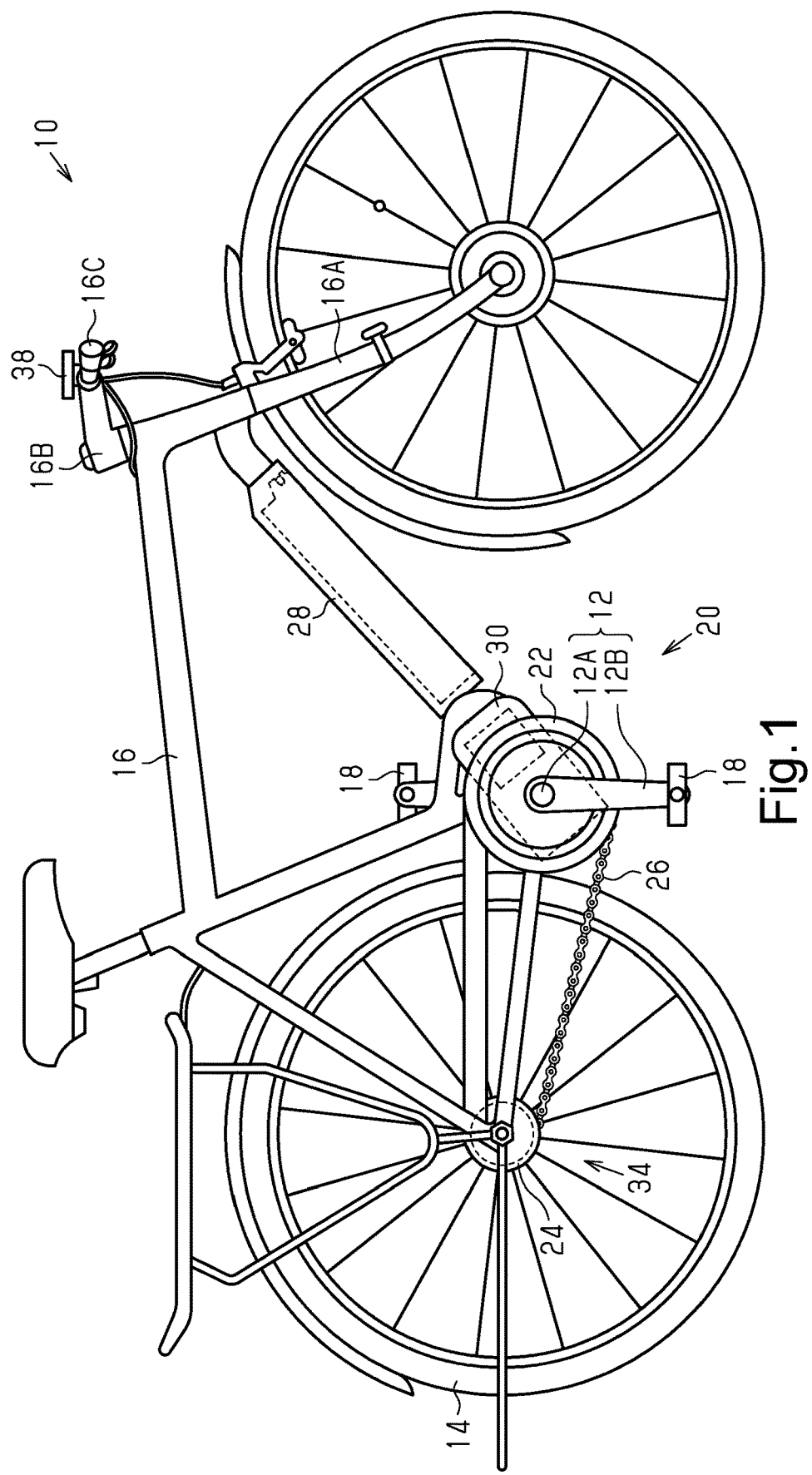
FIG. 1 is a side elevational view of a human-powered vehicle including a human-powered vehicle control device in accordance with a first embodiment.

As shown in FIG. 1, the human-powered vehicle 10 includes a crank 12 and a drive wheel 14. The human-powered vehicle 10 further includes a frame 16. Human driving force H is input to the crank 12. The crank 12 includes a crankshaft 12A rotatable relative to the frame 16 and a crank arm 12B provided on each of the opposite axial ends of the crankshaft 12A. A pedal 18 is connected to each of the crank arms 12B. The drive wheel 14 is driven by the rotation of the crank 12. The drive wheel 14 is supported by the frame 16. The crank 12 and the drive wheel 14 are connected by a drive mechanism 20. The drive mechanism 20 includes a first rotary body 22 coupled to the crankshaft 12A. The crankshaft 12A and the first rotary body 22 can be coupled by a first one-way clutch. The first one-way clutch is configured so as to rotate the first rotary body 22 forward in a case where the crank 12 rotates forward and not to rotate the first rotary body 22 to rotate backward in a case where the crank 12 rotates backward. The first rotary body 22 includes a sprocket, a pulley, or a bevel gear. The drive mechanism 20 further includes a linking member 26 and a second rotary body 24. The linking member 26 transmits the rotational force of the first rotary body 22 to the second rotary body 24. The linking member 26 includes, for example, a chain, a belt, or a shaft.

The second rotary body 24 is connected to the drive wheel 14. The second rotary body 24 includes a sprocket, a pulley, or a bevel gear. A second one-way clutch is preferably provided between the second rotary body 24 and the drive wheel 14. The second one-way clutch is configured to rotate the drive wheel 14 forward in a case where the second rotary body 24 rotates forward and not to rotate the drive wheel 14 backward in a case where the second rotary body 24 rotates backward.

The human-powered vehicle 10 includes a front wheel and a rear wheel. The front wheel is attached to the frame 16 by a front fork 16A. A handlebar 16C is connected to the front fork 16A by a stem 16B. In the embodiments described hereafter, the rear wheel will be referred to as the drive wheel 14 although the front wheel can serve as the drive wheel 14.

Figure 2:
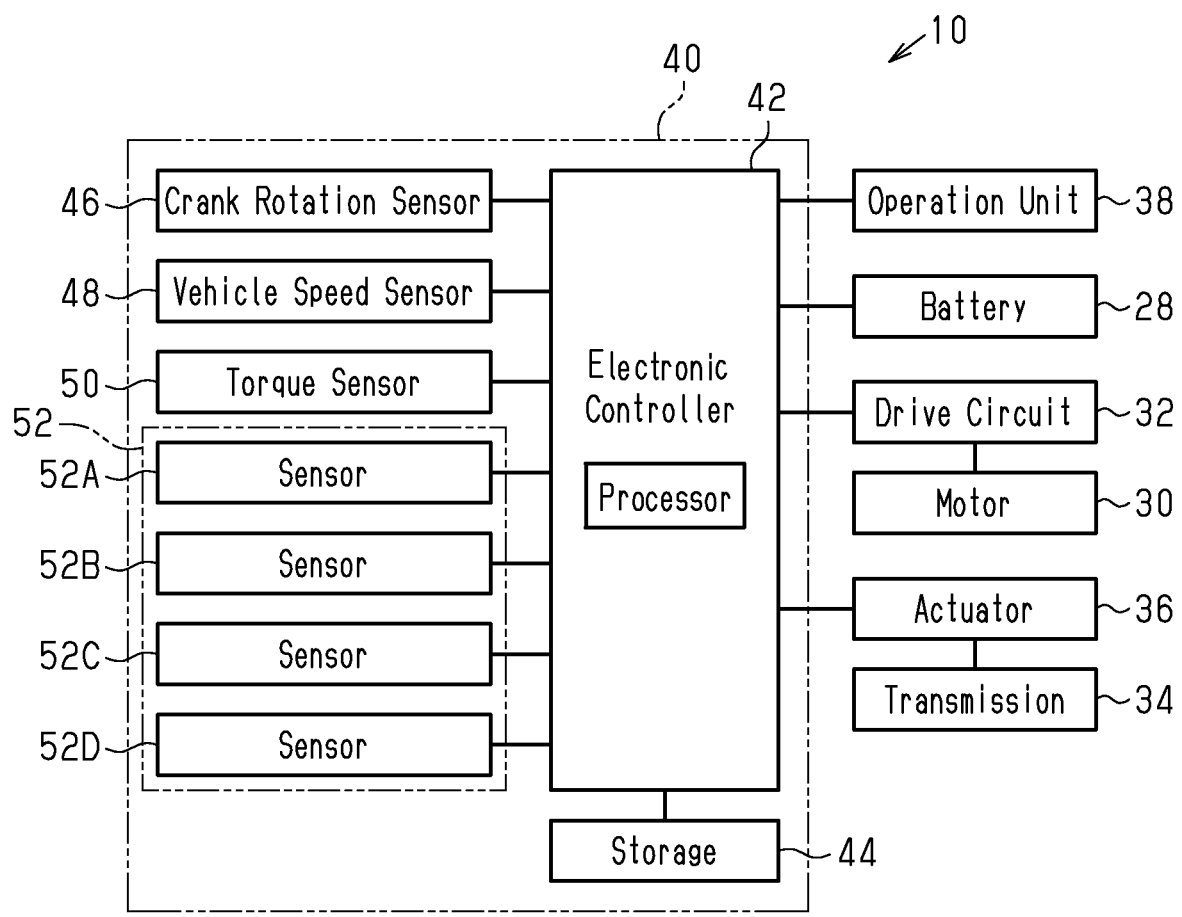
FIG. 2 is a block diagram showing an electrical configuration of the human-powered vehicle control device in accordance with the first embodiment.

As shown in FIGS. 1 and 2, the human-powered vehicle 10 further includes a battery 28, a motor 30, a drive circuit 32, a transmission 34, and an actuator 36.

The battery 28 includes one or more battery cells. The battery cell includes a rechargeable battery. The battery 28 is provided on the human-powered vehicle 10 and supplies power to other electric components such as a motor 30 and the control device 40, which are electrically connected to the battery 28 by wires. The battery 28 is connected to an electronic controller 42 of the control device 40 and communicates with the control device 40 through wired or wireless connection. Hereinafter, the electronic controller 42 will simply be referred to as the controller 42. The battery 28 is configured to communicate with the controller 42 through, for example, power line communication (PLC). The battery 28 can be attached to the outside of the frame 16 or at least partially accommodated in the frame 16.

The motor 30 and the drive circuit 32 are preferably provided in the same housing. The drive circuit 32 controls the power supplied from the battery 28 to the motor 30. The drive circuit 32 is connected to the controller 42 and configured to communicate with the controller 42 through wired or wireless connection. The drive circuit 32 is configured to communicate with the controller 42, for example, through serial communication. The drive circuit 32 drives the motor 30 in accordance with a control signal from the controller 42. The motor 30 assists in propulsion of the human-powered vehicle 10. The motor 30 includes an electric motor. The motor 30 is provided in a power transmission path of the human driving force H extending from the pedals 18 to the rear wheel or provided to transmit the rotation to the front wheel. The motor 30 is provided on the frame 16, the rear wheel, or the front wheel of the human-powered vehicle 10. In one example, the motor 30 is coupled to a power transmission path extending from the crankshaft 12A to the first rotary body 22. A one-way clutch is preferably provided in the power transmission path extending between the motor 30 and the crankshaft 12A so that the motor 30 is not rotated by the rotational force of the crank 12 in a case where the crankshaft 12A is rotated in the direction in which the human-powered vehicle 10 moves forward. The housing in which the motor 30 and the drive circuit 32 are provided can be provided with components other than the motor 30 and the drive circuit 32, such as a reduction gear that reduces the speed of the rotation of the motor 30 and outputs the rotation. The drive circuit 32 includes an inverter circuit.

The transmission 34, together with the actuator 36, forms a transmission device. The transmission 34 changes a ratio R of the rotational speed of the drive wheel 14 to the rotational speed N of the crank 12. The transmission 34 is configured to be able to change the ratio R in steps. The transmission 34 can be configured to change the ratio R in a stepless manner. The actuator 36 is configured to shift the ratio R with the transmission 34. The transmission 34 is controlled by the controller 42. The actuator 36 is connected to the controller 42 and configured to communicate with the controller 42 through wired or wireless connection. The actuator 36 is configured to communicate with the controller 42, for example, through power line communication (PLC). The actuator 36 shifts the ratio R with the transmission 34 in accordance with a control signal from the controller 42. The transmission 34 includes at least one of an internal transmission device and an external transmission device (derailleur).

The human-powered vehicle 10 further includes an operation unit 38. The operation unit 38 is provided on, for example, the handlebar. The operation unit 38 includes an operation member configured to be operated by the user and a detector that detects movement of the operation member. In a case where the operation member is operated, the detector detects the movement of the operation member and outputs an operation signal. The operation member includes a lever, a button, or the like. The detector includes an electric switch, a magnetic sensor, or the like.

The control device 40 includes the controller 42 that controls the motor 30 assisting in propulsion of the human-powered vehicle 10. The control device 40 further includes a storage (memory device) 44. The control device 40 also includes a crank rotation sensor 46, a vehicle speed sensor 48, and a torque sensor 50.

The crank rotation sensor 46 is used to detect a rotational speed N of the crank 12. The crank rotation sensor 46 is attached to the housing provided with the frame 16 or the motor 30 of the human-powered vehicle 10. The crank rotation sensor 46 includes a magnetic sensor that outputs a signal corresponding to a magnetic field intensity. An annular magnet, of which the magnetic field intensity changes in the circumferential direction, is provided on the crankshaft 12A or the power transmission path between the crankshaft 12A and the first rotary body 22. The crank rotation sensor 46 can be any sensor that can produce a signal that is indicative of the rotational speed N of the crank 12. The crank rotation sensor 46 is connected to the controller 42 and configured to communicate with the controller 42 through wired or wireless connection. The crank rotation sensor 46 outputs a signal corresponding to the rotational speed N of the crank 12 to the controller 42 of the control device 40.

The crank rotation sensor 46 can be provided on a member that rotates integrally with the crankshaft 12A in the power transmission path of the human driving force H extending from the crankshaft 12A to the first rotary body 22. For example, the crank rotation sensor 46 can be provided on the first rotary body 22 in a case where a one-way clutch is not provided between the crankshaft 12A and the first rotary body 22.

The vehicle speed sensor 48 is used to detect the rotational speed of the wheel. The vehicle speed sensor 48 is electrically connected to the controller 42 in a wired or wireless manner. The vehicle speed sensor 48 is connected to the controller 42 and configured to communicate with the controller 42 through wired or wireless connection. The vehicle speed sensor 48 can be any sensor that can produce a signal that is indicative of the rotational speed of the wheel. The vehicle speed sensor 48 outputs a signal corresponding to the rotational speed of the wheel to the controller 42. The controller 42 calculates a speed V of the human-powered vehicle 10 based on the rotational speed of the wheel. The controller 42 stops the motor 30 in a case where the speed V is higher than or equal to a predetermined value. The predetermined value is, for example, 25 kilometers per hour or 45 kilometers per hour. The vehicle speed sensor 48 preferably includes a magnetic reed forming a reed switch or a Hall element. The vehicle speed sensor 48 can be mounted on a chain stay of the frame 16 to detect a magnet attached to the rear wheel or provided on the front fork 16A to detect a magnet attached to the front wheel. Thus, in the case of a reed switch or a Hall element, the vehicle speed sensor 48 indirectly detects the rotational speed of the wheel by detecting a magnet attached to the wheel. Alternatively, the vehicle speed sensor 48 can directly detect the rotational speed of the wheel by using a speedometer gear assembly that is directly rotated by the wheel.

The torque sensor 50 is provided on the housing on which the motor 30 is provided. The torque sensor 50 is used to detect the torque TH of the human driving force H input to the crank 12. For example, in a case where the first one-way clutch is provided in the power transmission path, the torque sensor 50 is provided at the upstream side of the first one-way clutch. The torque sensor 50 includes a strain sensor, a magnetostrictive sensor, or the like. The strain sensor includes a strain gauge. In a case where the torque sensor 50 includes a strain sensor, the strain sensor is provided on the outer circumferential portion of a rotary body included in the power transmission path. The torque sensor 50 can be any sensor that can produce a signal that is indicative of the human drive force H inputted to the crank 12. The torque sensor 50 can include a wireless or wired communication unit. The communication unit of the torque sensor 50 is configured to communicate with the controller 42.

The terms "controller" and "electronic controller" as used herein refer to hardware that executes a software program and does not include a human. The controller 42 includes at least one processor that performs a predetermined control program. The processor is, for example, a central processing unit (CPU) or a micro-processing unit (MPU). The controller 42 can include one or more microcomputers with one or more processors. The controller 42 can include a plurality of processors located at separate positions. The storage 44 stores various control programs and information used for various control processes. The storage 44 includes any computer storage device or any non-transitory computer-readable medium with the sole exception of a transitory, propagating signal. For example, the storage 44 includes a nonvolatile memory and a volatile memory. The controller 42 and the storage 44 are, for example, provided on the housing on which the motor 30 is provided.

The controller 42 controls the motor 30 that assists in propulsion of the human-powered vehicle 10. The controller 42 controls the motor 30 so that the ratio A of an assist force M generated by the motor 30 to the human driving force H input to the crank 12 becomes equal to a predetermined ratio. The predetermined ratio can be a constant value, a value that changes in accordance with the human driving force H, a value that changes in accordance with the speed V, or a value that changes in accordance with the rotational speed N of the crank 12. The human driving force H includes the torque TH of the human driving force H or the power (watt) of the human driving force H. The ratio AT of the torque TM of the assist force M generated by the motor 30 to the torque TH of the human driving force H input to the human-powered vehicle 10 can also be referred to as the ratio A. The ratio AW of the power (watt) of the assist force M generated by the motor 30 to the power (watts) of the human driving force H input to the human-powered vehicle 10 can also be referred to as the ratio A. The work of the human driving force H is calculated by multiplying the torque TH of the human driving force H input to the crank 12 by the rotational speed N of the crank 12. In a case where the output of the motor 30 is input to the power transmission path of the human driving force H through the reduction gear, the output of the reduction gear is referred to as the assist force M generated by the motor 30. In a case where the speed V of the human-powered vehicle 10 becomes higher than or equal to a predetermined speed, the controller 42 stops the assistance provided by the motor 30. The predetermined speed is, for example, 25 km/h or 45 km/h.

The controller 42 controls the motor 30 in accordance with a first parameter P. The controller 42 controls the motor 30 in the first control state in a case where a first parameter P increases. Further, the controller 42 controls the motor 30 in the second control state that differs from the first control state in a case where the first parameter P decreases. For example, the controller 42 determines that the first parameter P has increased in a case where an increased amount of the first parameter P in a first predetermined period exceeds a first predetermined value. Further, the controller 42 determines that the first parameter P has decreased in a case where a decreased amount of the first parameter P in the first predetermined time exceeds a second predetermined value. The controller 42 also, for example, determines that the first parameter P has increased in a case where the first parameter P continuously increases over a second predetermined time. Further, the controller 42 determines that the first parameter P has decreased in a case where the first parameter P continuously decreases over the second predetermined time. Moreover, for example, the controller 42 determines that the first parameter P has increased in a case where determinations of an increase in the first parameter P have been successively given for a predetermined number of times or more. Further, the controller 42 determines that the first parameter P has decreased in a case where determinations of a decrease in the first parameter P have been successively given for a predetermined number of times or more. The first parameter P includes at least one of the rotational speed N of the crank 12 of the human-powered vehicle 10, the power WH of the human driving force H input to the human-powered vehicle 10, the acceleration G of the human-powered vehicle 10, the jerk J of the human-powered vehicle 10, and the inclination angle D of the human-powered vehicle 10.

The control device 40 further includes a detector 52 that detects the first parameter P. The term "detector" as used herein refers to a hardware device or instrument designed to detect the presence of a particular object or substance and to emit a signal in response. The term "detector" as used herein do not include a human. The detector 52 includes at least one of a sensor 52A, a sensor 52B, a sensor 52C, and a sensor 52D.

The sensor 52A is used to detect the rotational speed N of the crank 12. The sensor 52A has the same configuration as the crank rotation sensor 46. Although the crank rotation sensor 46 can be used as the sensor 52A, the sensor 52A can be separate from the crank rotation sensor 46.

The sensor 52B is used to detect the acceleration G of the human-powered vehicle 10. The sensor 52B has the same configuration as the vehicle speed sensor 48. Although the vehicle speed sensor 48 can be used as the sensor 52B, the sensor 52B can be separate from the vehicle speed sensor 48. In a case where the first parameter P includes the acceleration G of the human-powered vehicle 10, the controller 42 differentiates the speed V detected by the sensor 52B to calculate the acceleration G of the human-powered vehicle 10. In a case where the first parameter P includes the jerk J of the human-powered vehicle 10, the controller 42 differentiates the speed V twice to calculate the jerk J of the human-powered vehicle 10. The sensor 52B of the human-powered vehicle 10 can include an acceleration sensor. In a case where the first parameter P includes the jerk J of the human-powered vehicle 10, the controller 42 differentiates the acceleration G of the human-powered vehicle 10 detected by the acceleration sensor to calculate the jerk J of the human-powered vehicle 10.

The sensor 52C is used to detect the torque TH of the human driving force H. The sensor 52C has the same configuration as the torque sensor 50. Although the torque sensor 50 can be used as the sensor 52C, the sensor 52C can be separate from the torque sensor 50. In a case where the first parameter P includes the power WH of the human driving force H, the controller 42 multiplies the rotational speed N of the crank 12, which is detected by the sensor 52A, by the torque TH, which is detected by the sensor 52C, to calculate the power WH of the human driving force H.

The sensor 52D is used to detect the inclination angle D of a road surface on which the human-powered vehicle 10 travels. The inclination angle D of the road surface on which the human-powered vehicle 10 travels is the inclination angle in the traveling direction of the human-powered vehicle 10. The inclination angle D of the road surface on which the human-powered vehicle 10 travels corresponds to a pitch angle of the human-powered vehicle 10. In one example, the sensor 52D includes an inclination sensor. An example of the inclination sensor is a gyro sensor or an acceleration sensor. In another example, the sensor 52D includes a global positioning system (GPS) receiver. The sensor 52D can be any sensor or device that can produce a signal that is indicative of the inclination angle D of the road surface on which the human-powered vehicle 10 travels. The controller 42 calculates the inclination angle D of the road surface on which the human-powered vehicle 10 runs in accordance with the GPS information obtained by the GPS receiver and the road surface gradient included in map information recorded in advance in the storage 44 of the control device 40.

The controller 42 controls the motor 30 in accordance with the human driving force H input to the human-powered vehicle 10. In the first example, the controller 42 controls the motor 30 so that the response speed X of an output of the motor 30 with respect to a change in the human driving force H differs between the first control state and the second control state. The controller 42 includes a filter processing unit, and the response speed X can be changed by the filter processing unit. Specifically, the controller 42 changes the response speed X by changing a time constant K used by the filter processing unit. The filter processing unit includes, for example, a low pass filter. The response speed X includes a response speed X1 for the first control state and a response speed X2 for the second control state. The response speed X1 includes a response speed X11 for a case where the human driving force H decreases in the first control state and a response speed X12 for a case where the human driving force H increases in the first control state. The response speed X2 includes a response speed X21 for a case where the human driving force H decreases in the second control state and a response speed X22 for a case where the human driving force H increases in the second control state.

The controller 42 preferably controls the motor 30 so that the response speeds X11 and X21 becomes lower for a case where the human driving force H decreases than the response speeds X12 and X22 for a case where the human driving force H increases in any one of the first control state and the second control state. The controller 42 controls the motor 30 so that the response speeds X11 and X21 for a case where the human driving force H decreases become the equal to the response speeds X12 and X22 for a case where the human driving force H increases in any one of the first control state and the second control state.

The controller 42 preferably controls the motor 30 so that the response speed X11 becomes lower for a case where the human driving force H decreases in the first control state than the response speed X21 for a case where the human driving force H decreases in the second control state. The controller 42 can control the motor 30 so that the response speed X11 for a case where the human driving force H decreases in the first control state becomes equal to the response speed X21 for a case where the human driving force H decreases in the second control state.

The controller 42 preferably controls the motor 30 so that the response speed X12 becomes higher for a case where the human driving force H increases in the first control state than the response speed X22 for a case where the human driving force H increases in the second control state. The controller 42 further preferably controls the motor 30 so that the response speed X12 for a case where the human driving force H increases in the first control state becomes equal to the response speed X22 for a case where the human driving force H increases in the second control state.

Figure 3:
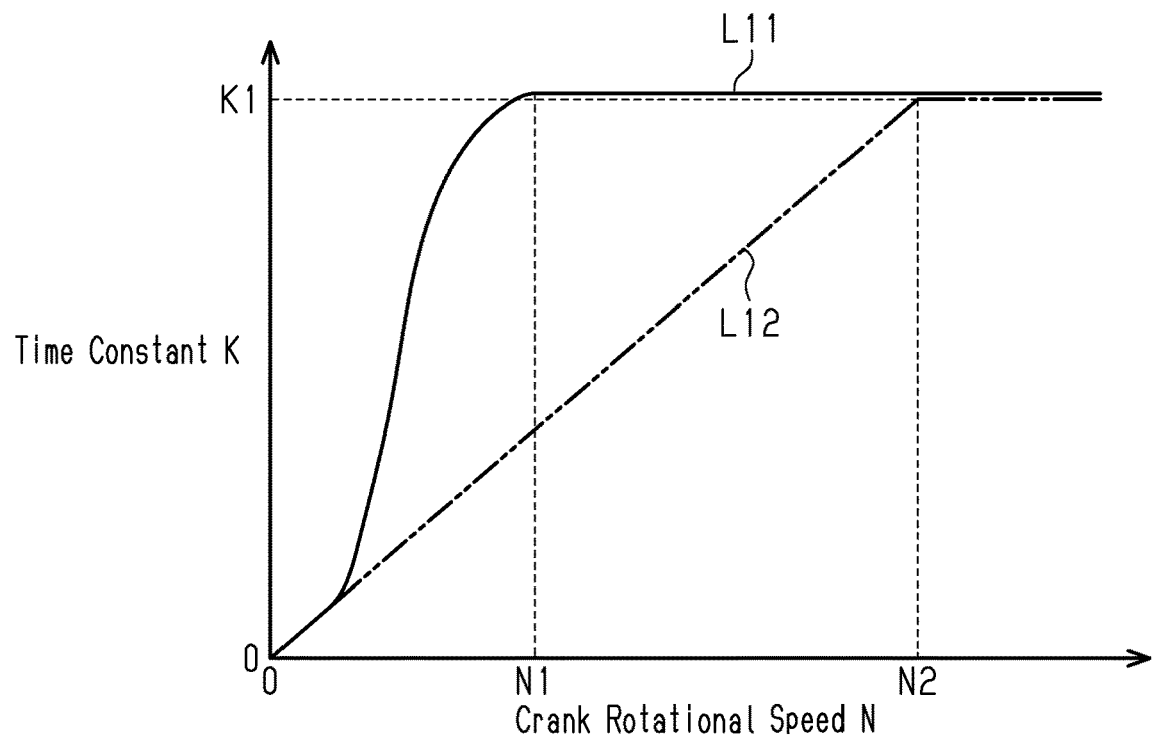
FIG. 3 is a graph showing an example of the relationship between the rotational speed of a crank and a time constant in accordance with the first embodiment.

FIG. 3 shows an example of the relationship between the rotational speed N of the crank 12 and the time constant K in the first control state and the second control state. In FIG. 3, solid line L11 shows an example of the relationship between the rotational speed N of the crank 12 and the time constant K in the first control state. In the first control state, the time constant K increases as the rotational speed N of the crank 12 increases. In the example of FIG. 3, the time constant K in the first control state is a first value K1 in a case where the rotational speed N of the crank 12 reaches a first speed N1 and is maintained at the first value K1 at higher than or equal to the first speed N1. In FIG. 3, double-dashed line L12 shows an example of the relationship between the rotational speed N of the crank 12 and the time constant K in the second control state. In the second control state, the time constant K increases as the rotational speed N of the crank 12 increases. In the example of FIG. 3, the time constant K in the second control state is the first value K1 in a case where the rotational speed N of the crank 12 reaches a second speed N2, which is higher than the first speed N1, and is maintained at the first value K1 as long as the rotational speed N is higher than or equal to the second speed N2. In the example of FIG. 3, the time constant K in the first control state is equal to the time constant K in the second control state if the rotational speed N of the crank 12 is higher than or equal to the second speed N2. Therefore, the response speed X11 is equal to the response speed X21 in a case where the rotational speed N of the crank 12 is higher than or equal to the second speed N2. The controller 42 can determine the time constant K in accordance with the torque TH instead of the rotational speed N of the crank 12 in the first control state and the second control state. In this case, the relationship in which the rotational speed N of the crank 12 in FIG. 3 is replaced by the torque TH can be the relationship between the torque TH and the time constant K in the first control state and the second control state.

In the second example, the controller 42 controls the motor 30 so that at least one of the ratio A of the assist force M generated by the motor 30 to the human driving force H and a maximum value TX of an output of the motor 30 differs between the first control state and the second control state. In this case, the controller 42 changes the ratio A in accordance with the rotational speed N of the crank 12.

In a case where the motor 30 is controlled so that the ratio A differs between the first control state and the second control state, the controller 42 preferably controls the motor 30 so that the ratio A1 becomes greater in the first control state than the ratio A2 in the second control state.

Figure 4:
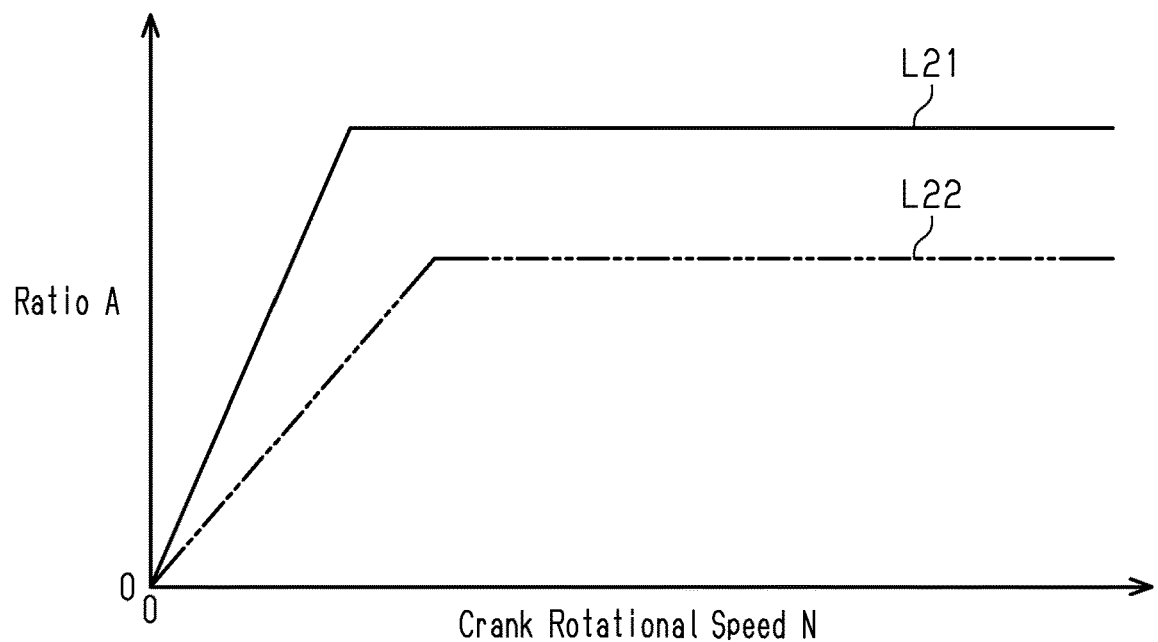
FIG. 4 is a graph showing an example of the relationship between the rotational speed of the crank and a ratio in accordance with the first embodiment.

FIG. 4 shows an example of the relationship between the rotational speed N of the crank 12 and the ratio A in the first control state and the second control state. In FIG. 4, solid line L21 shows an example of the relationship between the rotational speed N of the crank 12 and the ratio A1 in the first control state. In FIG. 4, double-dashed line L22 shows an example of the relationship between the rotational speed N of the crank 12 and the ratio A2 in the second control state.

In a case where the motor 30 is controlled so that the maximum value TX of the output of the motor 30 is different in at least one of in the first control state and the second control state, the controller 42 preferably controls the motor 30 so that the maximum value TX1 becomes greater in the first control state than the maximum value TX2 in the second control state.

Figure 5:
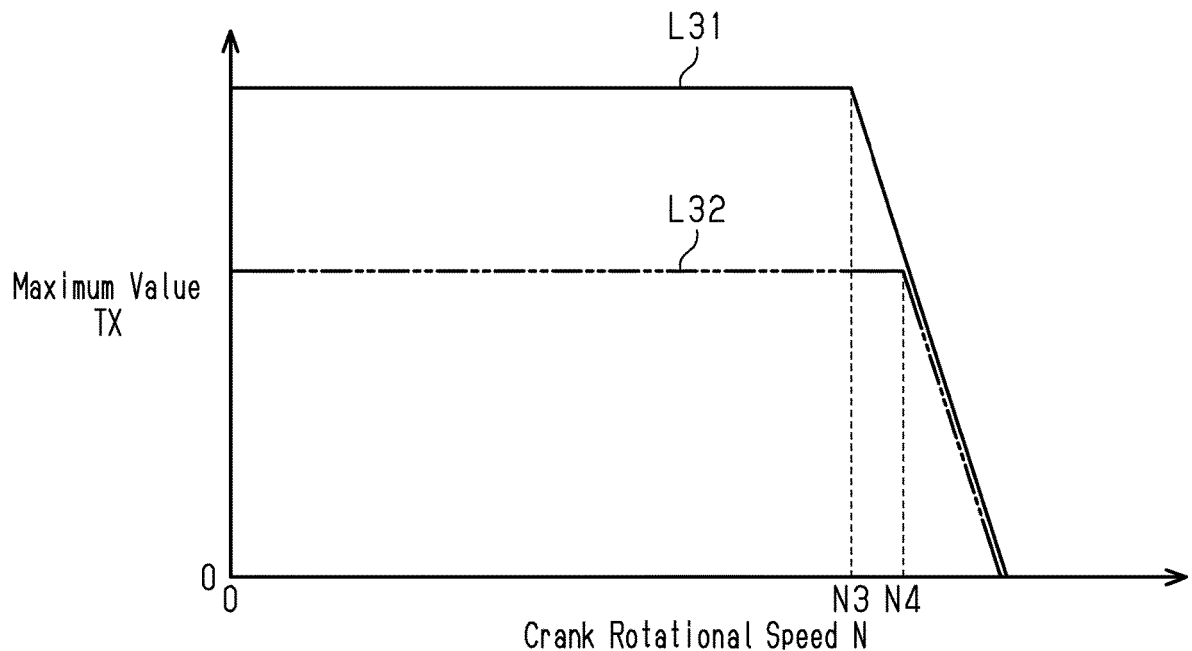
FIG. 5 is a graph showing an example of the relationship between the rotational speed of the crank and a maximum value of an output of a motor in accordance with the first embodiment.

FIG. 5 shows an example of the relationship between the rotational speed N of the crank 12 and the maximum value TX in the first control state and the second control state. In FIG. 5, solid line L31 shows an example of the relationship between the rotational speed N of the crank 12 and the maximum value TX1 in the first control state. In the example of FIG. 5, the maximum value TX1 in the first control state becomes a constant value if the rotational speed N of the crank 12 is less than the third speed N3. After reaching the third speed N3, the maximum value TX1 decreases as the rotational speed N of the crank 12 increases. In FIG. 5A, double-dashed line L32 shows an example of the relationship between the rotational speed N of the crank 12 and the maximum value TX2 in the second control state. In the example of FIG. 5, the maximum value TX2 in the second control state becomes a constant value if the rotational speed N of the crank 12 is less than a fourth speed N4, which is higher than the third speed N3. After reaching the fourth speed N4, the maximum value TX2 decreases as the rotational speed N of the crank 12 increases. In the example of FIG. 5, the maximum value TX1 is equal to the maximum value TX2 if the rotational speed N of the crank 12 is higher than or equal to the fourth speed N4.

The controller 42 is preferably configured to control the motor 30 in a first mode that permits switching between the first control state and the second control state and a second mode that prohibits switching to at least one of the first control state and the second control state. In one example, the controller 42 prohibits switching to the first control state in the second mode. In this case, the controller 42 controls the motor 30 in the second control state in a case where the second mode is selected. The controller 42 can control the motor 30 in a third control state that differs from the first control state and the second control state. In this case, the controller 42 can control the motor 30 in the third control state in a case where the second mode is selected. The controller 42 controls the motor 30 so that at least one of the response speed X, the ratio A, and the maximum value TX of the torque TM of the motor 30 in the third control state differs from at least one of the response speed X, the ratio A, and the maximum value TX of the torque TM of the motor 30 in at least one of the first control state and the second control state. The third control state can be the same as one of the first control state and the second control state. The controller 42 is preferably configured to switch between the first mode and the second mode in accordance with the operation of the operation unit 38. In a case where the operation unit 38 is operated, the controller 42 switches between the first mode and the second mode.

A process for switching between the first mode and the second mode will now be described with reference to FIG. 6. The controller 42 starts the process and proceeds to step S11 of the flowchart shown in FIG. 6 in a case where power is supplied from the battery 28 to the controller 42. As long as power is supplied, the controller 42 executes the process from step S11 in predetermined cycles.

In step S11, the controller 42 determines whether or not the operation unit 38 has been operated. In a case where the operation unit 38 has not been operated, the controller 42 terminates the process. In a case where the operation unit 38 has been operated in step S11, the controller 42 proceeds to step S12.

In step S12, the controller 42 determines whether or not in the first mode. Specifically, the controller 42 determines whether or not the motor 30 is controlled in the first mode. In a case where the motor 30 is controlled in the first mode, the controller 42 proceeds to step S13. In step S13, the controller 42 switches to the second mode and then terminates the process.

In a case where it is determined in step S12 that the motor 30 is not controlled in the first mode, the controller 42 proceeds to step S14. Specifically, in a case where the motor 30 is controlled in the second mode, the controller 42 proceeds to step S14. In step S14, the controller 42 switches to the first mode and then terminates the process.

Figure 7:
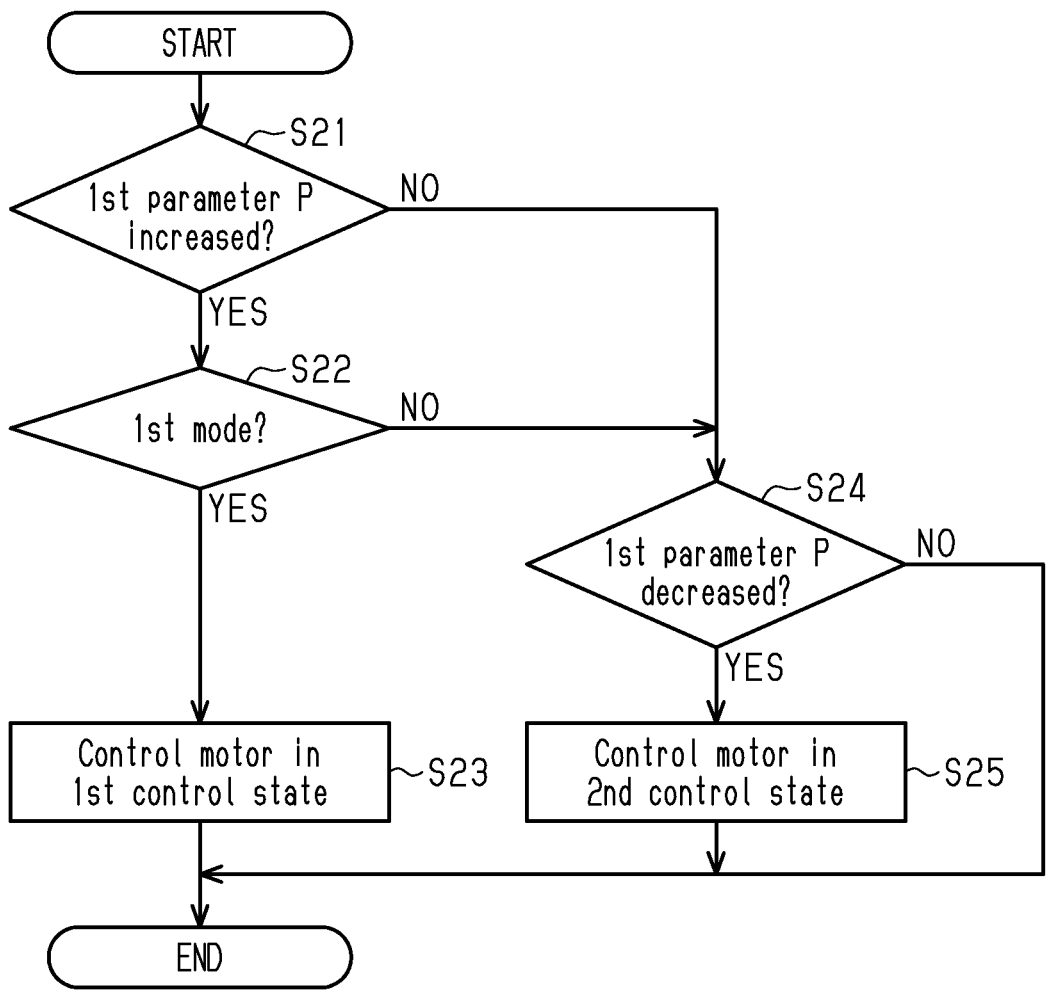
FIG. 7 is a flowchart of a motor-control process for controlling the motor executed by the electronic controller of FIG. 2.

A process for controlling the motor 30 will now be described with reference to FIG. 7. The controller 42 starts the process and proceeds to step S21 of the flowchart shown in FIG. 7 in a case where power is supplied from the battery 28 to the controller 42. As long as power is supplied, the controller 42 performs the process from step S21 in predetermined cycles.

In step S21, the controller 42 determines whether or not the first parameter P has increased. In a case where the first parameter P has increased, the controller 42 proceeds to step S22. In step S22, the controller 42 determines whether or not the motor 30 is controlled in the first mode. In the case of the first mode, the controller 42 proceeds to step S23. In step S23, the controller 42 controls the motor 30 in the first control state and terminates the process. Specifically, the controller 42 performs at least one of setting the response speed X to the response speed X1, setting the ratio A to the ratio A1, and setting the maximum value TX to the maximum value TX1.

In a case in which it is determined in step S21 that the first parameter P has not increased in S21, the controller 42 proceeds to step S24. In step S24, the controller 42 determines whether or not the first parameter P has decreased. In a case where the first parameter P has decreased, the controller 42 proceeds to step S25. In step S25, the controller 42 controls the motor 30 in the second control state and then terminates the process. Specifically, the controller 42 performs at least one of setting the response speed X to the response speed X2, setting the ratio A to the ratio A2, and setting the maximum value TX to the maximum value TX2.

In a case where it is determined in step S22 that the motor 30 is not controlled in the first mode, the controller 42 proceeds to step S24. In a case where the motor 30 is not controlled in the first mode, the controller 42 controls the motor 30 in the second mode in which switching to the first control state is prohibited. In a case where a negative determination is made in step S22, the controller 42 does not execute the process of step S23 and thereby does not switch to the first control state. Therefore, in the case of the second mode, the controller 42 does not control the motor 30 in the first control state.

In a case where it is determined that the first parameter P has not decreased in step S24, the controller 42 terminates the process. In this case, the controller 42 can continue to control the motor 30 in the first control state or the second control state selected in the previous process. Alternatively, the controller 42 can control the motor 30 in the third control state.

For example, in a case where the rider pedals the human-powered vehicle 10 to increase the speed V or torque TH of the human-powered vehicle 10 in a manner increasing the first parameter P, the controller 42 controls the motor 30 so that the output of the motor 30 becomes greater than in a case where the first parameter P decreases. Therefore, the controller 42 controls the motor 30 reflecting the intention of the rider.

Figure 8:
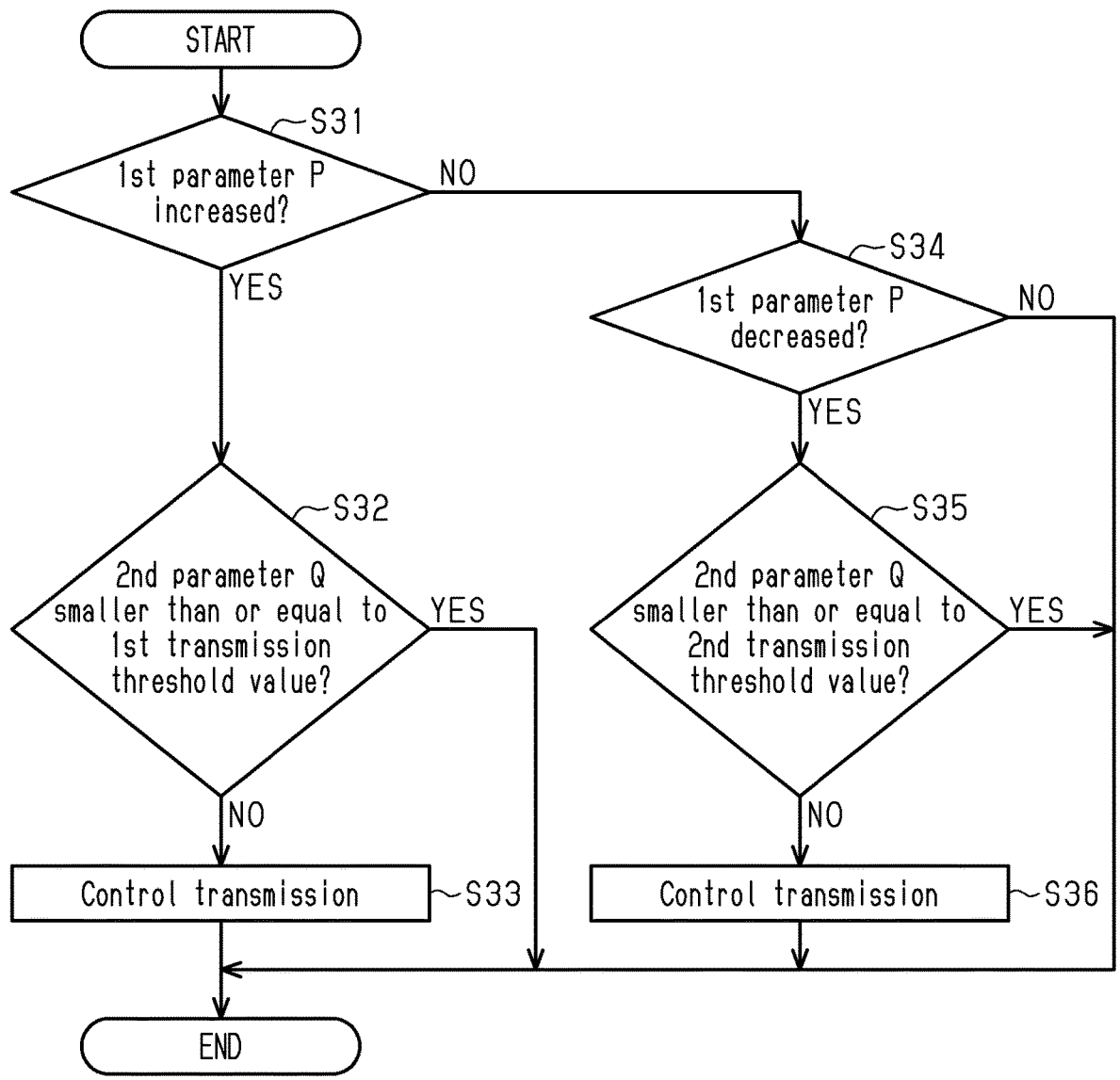
FIG. 8 is a flowchart of a transmission-control process executed by the electronic controller of FIG. 2.

A transmission-control process executed by the controller 42 of the control device 40 will now be described with reference to FIGS. 2 and 8. The transmission-control process of FIG. 8 is similar to motor-control process of FIG. 7, except in that the controller 42 controls the transmission 34 instead of the motor 30 in accordance with the first parameter P. Same reference numerals are given to those components that are the same as the corresponding components of the first embodiment. Such components will not be described in detail.

The control device 40 includes the controller 42 that controls the transmission 34 configured to change the ratio R of the rotational speed of the drive wheel 14 to the rotational speed N of the crank 12 in the human-powered vehicle 10 including the crank 12 and the drive wheel 14.

The controller 42 controls the transmission 34 in accordance with the first parameter P. In a case where a first parameter P increases, the controller 42 controls the transmission 34 to switch the ratio R between a predetermined first ratio R1 and a predetermined second ratio R2 in accordance with a second parameter Q related to a traveling state of the human-powered vehicle 10 and a first transmission threshold value Q1 set for the second parameter Q. The first parameter P includes at least one of the torque TH of the human driving force H input to the human-powered vehicle 10, the power WH of the human driving force H input to the human-powered vehicle 10, the acceleration G of the human-powered vehicle 10, the jerk J of the human-powered vehicle 10, and the inclination angle D of the human-powered vehicle 10. In a case where the first parameter P decreases, the controller 42 controls the transmission 34 to switch the ratio R between the predetermined first ratio R1 and the predetermined second ratio R2 in accordance with the second parameter Q and a second transmission threshold value Q2 set for the second parameter Q. The second transmission threshold value Q2 differs from the first transmission threshold value Q1.

The second parameter Q includes at least one of the rotational speed N of the crank 12, the torque TH of the human-powered vehicle 10, the power WH of the human driving force H input to the human-powered vehicle 10, the speed V of the human-powered vehicle 10, the acceleration G of the human-powered vehicle 10, the jerk J of the human-powered vehicle 10, and the inclination angle D of the human-powered vehicle 10.

The first transmission threshold value Q1 is preferably smaller than the second transmission threshold value Q2. In one example, the first transmission threshold value Q1 includes a range from a first upper limit threshold value Q11 to a first lower limit threshold value Q12. In one example, the second transmission threshold value Q2 includes a range from a second upper limit threshold value Q21 to a second lower limit threshold value Q22. The first upper limit threshold value Q11 is preferably smaller than the second upper limit threshold value Q21. The first lower limit threshold value Q12 is preferably smaller than the second lower limit threshold value Q22. The first transmission threshold value Q1 can include only the first upper limit threshold value Q11, and the second transmission threshold value Q2 can include only the second upper limit threshold value Q21. The first transmission threshold value Q1 can include only the first lower limit threshold value Q12, and the second transmission threshold value Q2 can include only the second lower limit threshold value Q22.

The transmission-control process for controlling the transmission 34 will now be described with reference to FIG. 8. The controller 42 starts the process and proceeds to step S31 of the flowchart shown in FIG. 8 in a case where power is supplied from the battery 28 to the controller 42. As long as power is supplied, the controller 42 performs the process from step S31 in predetermined cycles.

In step S31, the controller 42 determines whether or not the first parameter P has increased. In a case where the first parameter P has increased, the controller 42 proceeds to step S32. In step S32, the controller 42 determines whether or not the second parameter Q is smaller than or equal to the first transmission threshold value Q1. In a case where the second parameter Q is smaller than or equal to the first transmission threshold value Q1, the controller 42 terminates the process. In a case where the second parameter Q is not smaller than or equal to the first transmission threshold value Q1, the controller 42 proceeds to step S33.

In step S33, the controller 42 controls the transmission 34 and terminates the process. For example, in a case where the second parameter Q is greater than the first upper limit threshold value Q11, the controller 42 controls the transmission 34 to switch the ratio R from the predetermined first ratio R11 to the predetermined second ratio R12. In this case, the predetermined second ratio R12 is preferably smaller than the predetermined first ratio R11. In a case where the second parameter Q is greater than the first upper limit threshold value Q11 and the ratio R is not the smallest ratio R, the controller 42 can control the transmission 34 so that the ratio R is decreased by one step. Furthermore, for example, in a case where the second parameter Q is smaller than the first lower limit threshold value Q12, the controller 42 can control the transmission 34 to switch the ratio R from the predetermined first ratio R11 to the predetermined second ratio R12. In this case, the predetermined second ratio R12 is preferably greater than the predetermined first ratio R11. In a case where the second parameter Q is smaller than the first lower limit threshold value Q12 and the ratio R is not the maximum ratio R, the controller 42 can control the transmission 34 so that the ratio R is increased by one step.

In a case where the first parameter P has not increased in step S31, the controller 42 proceeds to step S34. In step S34, the controller 42 determines whether or not the first parameter P has decreased. In a case where the first parameter P has decreased, the controller 42 proceeds to step S35. In step S35, the controller 42 determines whether or not the second parameter Q is smaller than or equal to the second transmission threshold value Q2. In a case where the second parameter Q is smaller than or equal to the second transmission threshold value Q2, the controller 42 terminates the process. In a case where the second parameter Q is not smaller than or equal to the second transmission threshold value Q2, the controller 42 proceeds to step S36.

In step S36, the controller 42 controls the transmission 34 and then terminates the process. For example, in a case where the second parameter Q becomes greater than the second upper limit threshold value Q21, the controller 42 controls the transmission 34 so as to switch the ratio R from the predetermined first ratio R21 to the predetermined second ratio R22. In this case, the predetermined second ratio R22 is preferably smaller than the predetermined first ratio R21. In a case where the second parameter Q is greater than the second upper limit threshold value Q21 and the ratio R is not the smallest ratio R, the controller 42 can control the transmission 34 so that the ratio R is decreased by one step. Furthermore, for example, in a case where the second parameter Q is smaller than the second lower limit threshold value Q22, the controller 42 can control the transmission 34 to switch the ratio R from the predetermined first ratio R21 to the predetermined second ratio R22. In this case, the predetermined second ratio R22 is preferably greater than the predetermined first ratio R21. In a case where the second parameter Q is smaller than the second lower limit threshold value Q22 and the ratio R is not the maximum ratio R, the controller 42 controls the transmission 34 so that the ratio R is increased by one step.

In a case where the first parameter P has not decreased in step S34, the controller 42 terminates the process. In this case, the controller 42 can continue to control the motor 30 in the first control state or the second control state selected in the previous process. Alternatively, the controller 42 can control the transmission 34 in a control state that differs from the first control state and the second control state.

For example, in a case where the rider pedals the human-powered vehicle 10 increase the speed V or torque TH of the human-powered vehicle 10 so that the first parameter P increases, the ratio R is changed in accordance with the first transmission threshold value Q1, which is smaller than the second transmission threshold value Q2. Therefore, the ratio R tends to become small with respect to the increase of the second parameter Q. Therefore, the controller 42 controls the transmission 34 reflecting the intention of the rider.

Modifications

The description related with the above embodiments exemplifies, without any intention to limit, an applicable form of a human-powered vehicle control device according to the present disclosure. In addition to the embodiments described above, the human-powered vehicle control device according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

Figure 9:
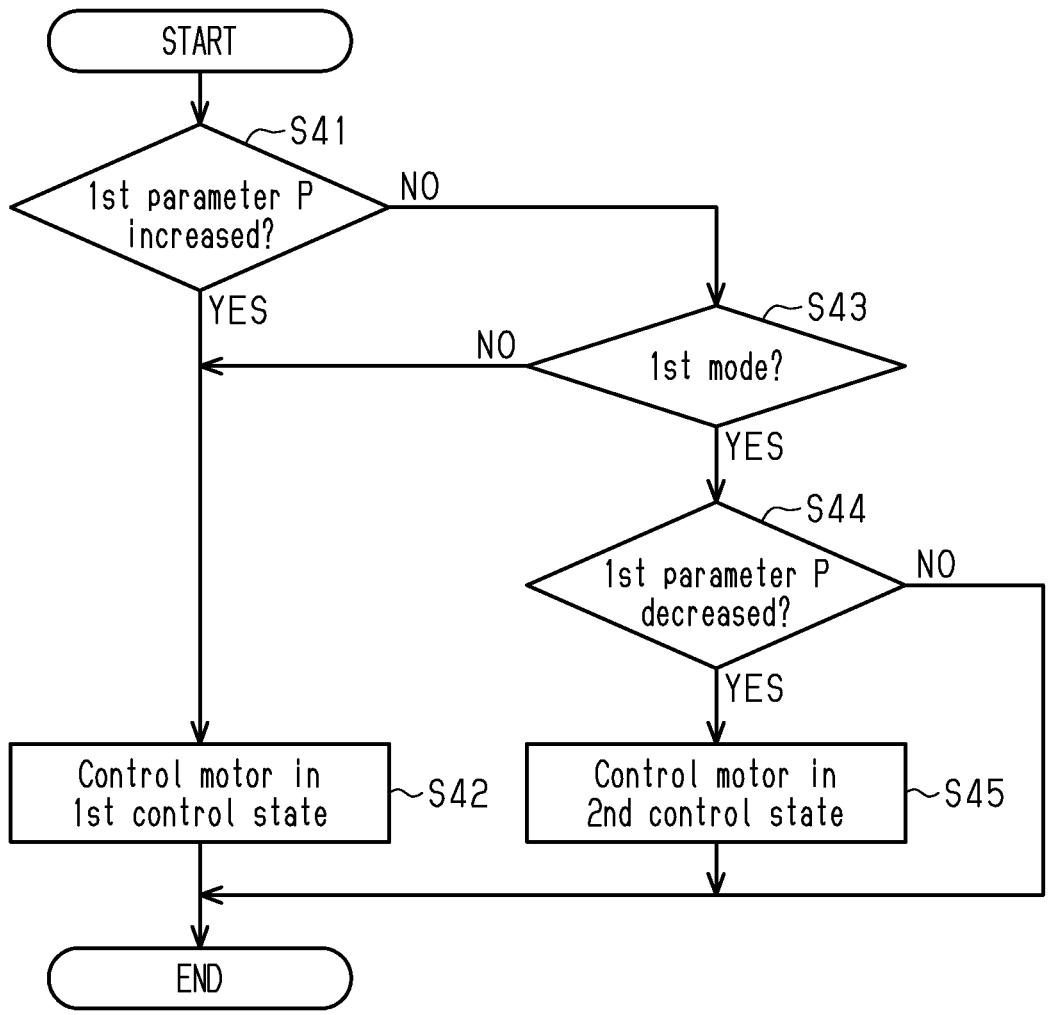
FIG. 9 is a flowchart of a modified motor-control process executed by the electronic controller of FIG. 2.

The controller 42 of the first embodiment can prohibit switching to the second control state in the second mode. In this case, the processing order in FIG. 7 can be changed to the processing order shown in FIG. 9. In FIG. 9, the same steps as FIG. 7 are executed although in a different order. In step S41, the controller 42 determines whether or not the first parameter P has increased. In a case where the first parameter P has increased, the controller 42 proceeds to step S42. In step S42, the controller 42 controls the motor 30 in the first control state and then terminates the process. In a case where it is determined in step S41 that the first parameter P has not increased, the controller 42 proceeds to step S43. In step S43, the controller 42 determines whether or not the motor 30 is controlled in the first mode. In a case where it is determined that the motor 30 is not controlled in the first mode, the controller 42 proceeds to step S42. In a case where the motor 30 is controlled in the first mode, the controller 42 proceeds to step S44. In step S44, the controller 42 determines whether or not the first parameter P has decreased. In a case where the first parameter P has decreased, the controller 42 proceeds to step S45. In step S45, the controller 42 controls the motor 30 in the second control state and terminates the process. In a case where it is determined that the first parameter P has not decreased in step S44, the controller 42 terminates the process. In a case where it is determined in step S43 that the motor 30 is not controlled in the first mode, the controller 42 does not execute the process of step S45. Therefore, in a case where the motor 30 is controlled in the second mode, the controller 42 does not control the motor 30 in the second control state.

Figure 6:
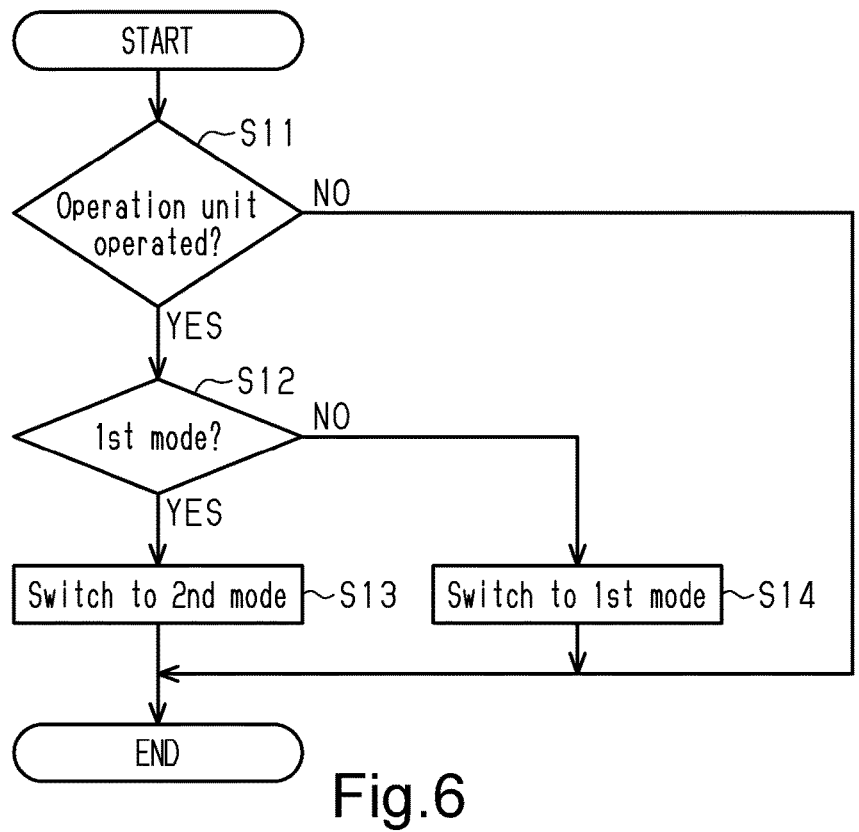
FIG. 6 is a flowchart of a mode switching process executed by an electronic controller of FIG. 2.

The process shown in FIG. 6 can be omitted from the first embodiment. In this case, the controller 42 controls the motor 30 in the same manner as in the first mode. In this case, the controller 42 can omit the process of step S22 from FIG. 7. Further, in this case, the operation unit 38 can be omitted from the human-powered vehicle 10.

In the first embodiment, the controller 42 can switch between the first mode and the second mode in accordance with the traveling state of the human-powered vehicle 10 in place of or in addition to the operation of the operation unit 38.

In the second embodiment, the controller 42 can be configured to control the transmission 34 between the first mode that permits switching between the first control state and the second control state and the second mode that prohibits switching to at least one of the first control state and the second control state. In this case, the controller 42 can execute the same steps as those shown in FIG. 6 of the first embodiment. In this case, in the process of FIG. 8, a step of prohibiting switching to at least one of the first control state and the second control state can be added in the second mode. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

What is claimed is:

1. A human-powered vehicle control device comprising:
an electronic controller configured to control a motor assisting in propulsion of a human-powered vehicle, the electronic controller controlling the motor in accordance with a human driving force input to the human-powered vehicle,
the electronic controller being configured to control the motor in a first control state in a case where a first parameter increases, the first parameter including an inclination angle of the human-powered vehicle,
the electronic controller being configured to control the motor in a second control state that differs from the first control state in a case where the first parameter decreases,
the electronic controller being further configured to control the motor so that a response speed of an output of the motor with respect to a change in the human driving force differs between the first control state and the second control state.

2. The human-powered vehicle control device according to claim 1, wherein
the electronic controller is configured to control the motor so that the response speed is lower for a case where the human driving force decreases in the first control state than for a case where the human driving force decreases in the second control state.

3. The human-powered vehicle control device according to claim 1, wherein
the electronic controller is configured to control the motor so that the response speed is higher for a case where the human driving force increases in the first control state than for a case where the human driving force increases in the second control state.

4. The human-powered vehicle control device according to claim 1, wherein
the electronic controller is configured to control the motor in any one of the first control state and the second control state so that the response speed is lower for a case where the human driving force decreases than for a case where the human driving force increases.

5. The human-powered vehicle control device according to claim 1, wherein
the electronic controller is configured to control the motor in accordance with the human driving force input to the human-powered vehicle, and
the electronic controller is configured to control the motor so that at least one of a ratio of an assist force generated by the motor to the human driving force and a maximum value of an output of the motor differs between the first control state and the second control state.

6. The human-powered vehicle control device according to claim 5, wherein
the electronic controller is configured to control the motor so that the ratio is greater in the first control state than in the second control state.

7. The human-powered vehicle control device according to claim 6, wherein
the electronic controller is configured to control the motor so that the maximum value is greater in the first control state than in the second control state.

8. The human-powered vehicle control device according to claim 1, wherein
the electronic controller is configured to control the motor in a first mode that permits switching between the first control state and the second control state and a second mode that prohibits switching to at least one of the first control state and the second control state.

9. The human-powered vehicle control device according to claim 8, wherein
the electronic controller is configured to switch between the first mode and the second mode in accordance with operation of an operation unit.

10. A human-powered vehicle control device comprising:
an electronic controller configured to control a transmission in a human-powered vehicle including a crank and a drive wheel, the transmission changing a ratio of a rotational speed of the drive wheel to a rotational speed of the crank,
the electronic controller being configured to control the transmission in a case where a first parameter increases, so as to switch the ratio between a predetermined first ratio and a predetermined second ratio in accordance with a second parameter related to a running state of the human-powered vehicle and a first transmission threshold value set for the second parameter, the first parameter including at least one of torque of human driving force input to the human-powered vehicle, power of the human driving force input to the human-powered vehicle, acceleration of the human-powered vehicle, jerk of the human-powered vehicle, and inclination angle of the human-powered vehicle, and the electronic controller being configured to control the transmission in a case where the first parameter decreases so as to switch the ratio between the predetermined first ratio and the predetermined second ratio in accordance with the second parameter and a second transmission threshold value that differs from the first transmission threshold value and is set for the second parameter.

11. The human-powered vehicle control device according to claim 10, wherein
the first transmission threshold value is smaller than the second transmission threshold value.

12. The human-powered vehicle control device according to claim 11, wherein
the second parameter includes at least one of the rotational speed of the crank, the torque of the human-powered vehicle, the power of the human driving force input to the human-powered vehicle, speed of the human-powered vehicle, the acceleration of the human-powered vehicle, the jerk of the human-powered vehicle, and the inclination angle of the human-powered vehicle.

13. The human-powered vehicle control device according to claim 1, further comprising
a detector that detects the first parameter.

14. The human-powered vehicle control device according to claim 1, wherein
the electronic controller is configured to determine that the first parameter increases in a case where an increase amount by which the first parameter increased in a first predetermined period exceeds a first predetermined value, and
the electronic controller is configured to determine that the first parameter decreases in case where a decrease amount by which the first parameter decreased in the first predetermined time exceeds a second predetermined value.

15. The human-powered vehicle control device according to claim 1, wherein
the electronic controller is configured to determine that the first parameter increases in a case where the first parameter continuously increases over a second predetermined period, and
the electronic controller is configured to determine that the first parameter decreases in case where the first parameter continuously decreases over the second predetermined period.

16. The human-powered vehicle control device according to claim 1, wherein
the electronic controller is configured to determine that the first parameter increases in a case where determinations of an increase in the first parameter have been successively given for a predetermined number of times or more, and
the electronic controller is configured to determine that the first parameter decreases in a case where determinations of a decrease in the first parameter have been successively given for a predetermined number of times or more.

17. A human-powered vehicle control device comprising:
an electronic controller configured to control a motor assisting in propulsion of a human-powered vehicle, the electronic controller controlling the motor in accordance with a human driving force input to the human-powered vehicle,
the electronic controller being configured to control the motor in a first control state in a case where a first parameter increases, the first parameter including at least one of rotational speed of a crank of the human-powered vehicle, power of human driving force input to the human-powered vehicle, acceleration of the human-powered vehicle, jerk of the human-powered vehicle, and inclination angle of the human-powered vehicle,
the electronic controller being configured to control the motor in a second control state that differs from the first control state in a case where the first parameter decreases,
the electronic controller being further configured to control the motor by changing a time constant so that a response speed of an output of the motor with respect to a change in the human driving force differs between the first control state and the second control state.

* * * * *